United States Patent
Yahia et al.

(10) Patent No.: US 12,479,269 B2
(45) Date of Patent: Nov. 25, 2025

(54) THERMAL CONDITIONING SYSTEM FOR A MOTOR VEHICLE

(71) Applicant: VALEO SYSTEMES THERMIQUES, La Verriere (FR)

(72) Inventors: Mohamed Yahia, La Verriere (FR); Patricia Gardie, La Verriere (FR); Bertrand Nicolas, La Verriere (FR); Muriel Porto, La Verriere (FR)

(73) Assignee: VALEO SYSTEMES THERMIQUES, La Verriere (FR)

( * ) Notice: Subject to any disclaimer, the term of this patent is extended or adjusted under 35 U.S.C. 154(b) by 221 days.

(21) Appl. No.: 18/253,985

(22) PCT Filed: Nov. 16, 2021

(86) PCT No.: PCT/EP2021/081755
§ 371 (c)(1),
(2) Date: May 23, 2023

(87) PCT Pub. No.: WO2022/106374
PCT Pub. Date: May 27, 2022

(65) Prior Publication Data
US 2023/0406067 A1  Dec. 21, 2023

(30) Foreign Application Priority Data
Nov. 23, 2020 (FR) ..................... 2012035

(51) Int. Cl.
*B60H 1/00* (2006.01)
*B60H 1/32* (2006.01)
*F25B 43/00* (2006.01)

(52) U.S. Cl.
CPC ..... *B60H 1/00921* (2013.01); *B60H 1/32284* (2019.05); *B60H 1/323* (2013.01); *F25B 43/006* (2013.01); *F25B 2500/01* (2013.01)

(58) Field of Classification Search
CPC .......... B60H 1/00921; B60H 1/32284; B60H 1/323; F25B 43/006; F25B 2500/01; F24F 2012/007; F24F 11/81
See application file for complete search history.

(56) References Cited

U.S. PATENT DOCUMENTS 3,938,349 A * 2/1976 Ueno ............... F25B 40/00
62/503
5,946,928 A * 9/1999 Wiggs ............... F25B 39/00
165/45

(Continued)

FOREIGN PATENT DOCUMENTS

DE 102006001919 A1 7/2007
FR 2853859 A1 10/2004
(Continued)

OTHER PUBLICATIONS

European Patent Office, International Search Report (with English translation) and Written Opinion of corresponding International Application No. PCT/EP2021/081755, dated Feb. 11, 2022.

*Primary Examiner* — Nelson J Nieves
(74) *Attorney, Agent, or Firm* — Osha Bergman Watanabe & Burton LLP

(57) ABSTRACT

A thermal conditioning system for a motor vehicle, including a refrigerant circuit including a main loop including in succession: a compression device; a first heat exchanger; a first expansion device; a second heat exchanger; a third heat exchanger; a refrigerant accumulation device. An inner volume of a portion of main loop extending from an outlet of the first heat exchanger to an inlet of the first expansion device defines a first reference volume. An inner volume of the accumulation device defines a second reference volume. The ratio of the first reference volume and the second reference volume is greater than 0.2.

14 Claims, 4 Drawing Sheets

(56) References Cited

U.S. PATENT DOCUMENTS

| | | | |
|---|---|---|---|
| 2019/0366800 A1* | 12/2019 | Durrani | B60H 1/00921 |
| 2020/0282806 A1* | 9/2020 | Sharma | B60H 1/00907 |
| 2020/0338950 A1* | 10/2020 | Kim | B60H 1/00921 |
| 2021/0001686 A1* | 1/2021 | Kim | B60H 1/00921 |
| 2021/0129627 A1* | 5/2021 | Kim | B60H 1/00278 |
| 2021/0370745 A1* | 12/2021 | Carlson | B60L 1/003 |
| 2021/0379959 A1* | 12/2021 | Smith | B60H 1/323 |
| 2022/0234423 A1* | 7/2022 | Nicolas | B60H 1/3205 |

FOREIGN PATENT DOCUMENTS

| | | |
|---|---|---|
| FR | 3096121 A1 | 5/2019 |
| JP | H1163741 A | 3/1999 |
| JP | 2015128916 A | 7/2015 |

\* cited by examiner

THERMAL CONDITIONING SYSTEM FOR A MOTOR VEHICLE

TECHNICAL FIELD

The present invention relates to the field of thermal conditioning systems for motor vehicles. Systems of this type make it possible to ensure thermal regulation of different units or parts of the vehicle, such as the passenger space or an electrical energy storage battery, in the case of a vehicle with electrical propulsion. Heat exchanges are mainly managed by the compression and expansion of a refrigerant within a number of heat exchangers.

BACKGROUND OF THE INVENTION

Multiple bypass branches present in the refrigerant circuit make it possible to create numerous different operating modes. In fact, by adapting the configuration of the refrigerant circuit by opening different stop valves selectively, it is possible to select the heat exchangers through which the refrigerant passes. It is thus possible to put into effect selectively in particular the cooling of the passenger space air, or the heating thereof, or the dehumidification of the passenger space air.

According to the operating mode selected, and according to the ambient conditions in which the vehicle is travelling, the quantity of refrigerant circulating in the refrigerant circuit is not constant. In fact, the minimal pressure and the maximal pressure in the circuit depend on the conditions of use, and thus the density of the refrigerant circulating in the circuit depends on the conditions of use. In addition, the length of the portions of circuit through which the refrigerant passes is not always the same. A refrigerant accumulator, positioned in the circuit upstream from the compressor, thus makes it possible to obtain a reserve of refrigerant in the circuit. An accumulator comprises a refrigerant inlet, a refrigerant outlet, and a buffer volume between the inlet and the outlet, this volume making it possible to store a quantity of refrigerant. A conventional motor vehicle accumulator can have a volume of 0.8 L to 1 L. This volume makes it possible to cover the variations of the mass of chemical refrigerant, such as R1234yf, circulating in the circuit.

In certain vehicles, the space which is available under the hood can be very limited, and it can be very difficult, or even impossible, to implant an accumulation device which has the conventional volume.

An objective of the present invention is thus to provide a thermal conditioning system which can operate using an accumulator with a volume smaller than those of the systems according to the prior art, while maintaining the same thermodynamic performance levels. The implantation of the thermal conditioning circuit in the vehicle is first facilitated.

SUMMARY OF THE INVENTION

For this purpose, the present invention proposes a thermal conditioning system for a motor vehicle, comprising a refrigerant circuit which is configured to circulate a refrigerant, the refrigerant circuit comprising:—a main loop comprising in succession in the direction of travel of the refrigerant:—a compression device;—a first heat exchanger which is configured to exchange heat with a first heat-exchange fluid;—a first expansion device;—a second heat exchanger which is configured to exchange heat with a flow of air outside a passenger space of the vehicle;—a second expansion device;—a third heat exchanger which is configured to exchange heat with a flow of air inside the passenger space of the vehicle;—a refrigerant accumulation device;—a first bypass branch B connecting a first connection point which is positioned on the main loop, and is between the second heat exchanger and the second expansion device, to a second connection point which is positioned on the main loop and is between the third heat exchanger and the accumulation device, the first bypass branch comprising a first stop valve, wherein an inner volume of a portion of main loop extending from an outlet of the first heat exchanger to an inlet of the first expansion device defines a first reference volume, wherein an inner volume of the accumulation device defines a second reference volume, and wherein the ratio of the first reference volume and the second reference volume is greater than 0.2, and preferably greater than 0.4.

The second reference volume is selected so as to be smaller than that of the solutions according to the prior art. In other words, the refrigerant accumulation device is smaller, and is therefore easier to implant in the vehicle. In order to compensate for this, the volume of the portion of main loop extending from an outlet of the first heat exchanger to an inlet of the first expansion device is increased in comparison with the solutions according to the prior art. This additional volume makes it possible to constitute a refrigerant storage volume, which compensates for the decrease in the volume of the accumulation device. In fact, this portion of circuit contains refrigerant in liquid form in the modes of use where the mass of refrigerant circulating is small, and thus constitutes a natural area of accumulation of refrigerant. The first and the second reference volumes are selected such that a reserve of refrigerant remains in the accumulation device in all the conditions of use of the thermal conditioning circuit.

The characteristics listed in the following paragraphs can be implemented independently from one another, or according to all the combinations technically possible.

The second reference volume is smaller than 0.65 L.

The thermal conditioning system comprises a second bypass branch connecting a third connection point positioned on the main loop and between the first heat exchanger and the first expansion device, to a fourth connection point positioned on the main loop and between the first connection point and the second expansion device, the second bypass branch comprises a second stop valve, the sum of the first reference volume and an inner volume of a portion of second bypass branch extending from the third connection point to an inlet of the stop valve defines a third reference volume, and the ratio of the third reference volume and the second reference volume is greater than 0.3, and preferably greater than 0.5.

According to one embodiment, the first heat exchanger comprises a first heat-exchange section which is configured to ensure condensation of the refrigerant, and a second heat-exchange section which is configured to ensure sub-cooling of the refrigerant, the sum of the third reference volume and an inner volume of the second heat-exchange section of the first heat exchanger defines a fourth reference volume, and the ratio of the fourth reference volume and the second reference volume is greater than 0.65, and preferably greater than 0.95.

According to one embodiment of the thermal conditioning system, the first heat exchanger is configured to exchange heat with a flow of air inside the passenger space of the vehicle.

According to another embodiment of the thermal conditioning system, the first heat exchanger is configured to exchange heat with a heat-exchange liquid circulating in a heat-exchange liquid circuit.

The heat-exchange liquid circuit comprises a fifth heat exchanger, which is configured to exchange heat with a flow of air inside the passenger space of the vehicle.

According to one embodiment, the thermal conditioning system comprises a third bypass branch connecting a fifth connection point positioned on the main loop, and between the fourth connection point and the second expansion device, to a sixth connection point positioned on the main loop and between the second connection point and the accumulation device, the third bypass branch comprising a third expansion device positioned upstream from a fourth heat exchanger.

The fourth heat exchanger is coupled thermally to an element of an electrical traction chain of the vehicle. The element of the electrical traction chain can be an electrical energy storage battery. The element of the electrical traction chain can be an electronic module for controlling an electric traction motor of the vehicle.

According to one embodiment of the thermal conditioning system, a sum of an inner volume of a portion of main loop extending from an outlet of the second heat exchanger to the first connection point, and an inner volume of a portion of first bypass branch extending from the first connection point to an inlet of the first stop valve, defines a fifth reference volume, and the fifth reference volume is smaller than 0.03 L.

According to one embodiment, the ratio of the fifth reference volume and the second reference volume is smaller than 0.5, and preferably smaller than 0.1.

According to one embodiment of the thermal conditioning system, an inner diameter of a portion of main loop between an outlet of the first heat exchanger and an inlet of the first expansion device is larger than 13 mm, and preferably larger than 15 mm.

According to one embodiment, the main loop comprises a non-return valve positioned between the first connection point and the fourth connection point, a length of a portion of main loop extending from the first connection point to the non-return valve defines a first reference distance, and a length of a portion of main loop extending from the non-return valve to the fourth connection point defines a second reference distance, and the ratio of the first reference distance and the second reference distance is smaller than 0.5.

Preferably, a volume of a portion of main loop extending from the first connection point to the non-return valve is smaller than 0.03 L.

According to one embodiment of the thermal conditioning system, a portion of main loop extending from an outlet of the first heat exchanger to an inlet of the first expansion device comprises a first part with a first cross-section of passage of refrigerant, and a second part with a second cross-section of passage of refrigerant, the ratio between the second cross-section of passage and the first cross-section of passage being greater than 2.

The invention also concerns a process for operation of a thermal conditioning system as previously described, in a heating mode, in which:
the refrigerant circulates in the compression device, where it goes to high pressure, and circulates in succession in the first heat exchanger, where it yields heat to the heat-exchange fluid, and goes into the liquid state, into the first expansion device, where it goes to low pressure, into the second heat exchanger, where it absorbs heat from the flow of exterior air and goes into the gaseous state, into the first bypass branch, and into the accumulation device;—then the low-pressure refrigerant returns to the compression device.

The invention also relates to a process for operation of a thermal conditioning system as previously described, in a so-called cooling mode, in which:
the refrigerant circulates in the compression device, where it goes to high pressure, and circulates in succession in the first heat exchanger without yielding heat to the flow of interior air, into the first expansion device, into the second heat exchanger, where it yields heat to the flow of exterior air, and goes into the liquid state;—into the second expansion device where it goes to low pressure, into the third heat exchanger, where it goes into the gaseous state and absorbs heat from the flow of interior air, and into the accumulation device;—then the low-pressure refrigerant returns to the compression device.

The invention also relates to a process for operation of a thermal conditioning system as previously described, in a so-called cooling mode, in which:
the refrigerant circulates in the compression device, where it goes to high temperature, and circulates in succession in the first heat exchanger, where it yields heat to the heat-transfer liquid and goes into the liquid state, into the first expansion device, and into the second heat exchanger;—into the second expansion device, where it goes to low pressure, into the third heat exchanger, where it goes into the gaseous state and absorbs heat from the flow of interior air, and into the accumulation device;—then the low-pressure refrigerant returns to the compression device.

The invention also relates to a process for operation of a thermal conditioning system as previously described, in a so-called parallel dehumidification mode, in which:
the refrigerant circulates in the compression device, where it goes to high pressure, and circulates in succession in the first heat exchanger, where it yields heat to the heat transfer fluid and goes into the liquid state;—the refrigerant is divided between a first flow circulating in the main loop and a second flow circulating in the second bypass branch;—the first flow circulates in the first expansion device, where it goes to low pressure, into the second heat exchanger, where it absorbs heat from the flow of exterior air and goes into the gaseous state, circulates in succession in the first bypass branch;—the second flow reaches the main loop upstream from the second expansion device, where it goes to low pressure, and circulates in the third heat exchanger, where it absorbs heat from the flow of interior air, and goes into the gaseous state;—the first flow and the second flow join at the second connection point, then circulate in the accumulation device;—then the low-pressure refrigerant returns to the compression device.

BRIEF DESCRIPTION OF THE DRAWINGS

Other characteristics, details and advantages will become apparent on reading the following detailed description, and on studying the appended drawings, in which.

DETAILED DESCRIPTION OF THE INVENTION

Figure 1:
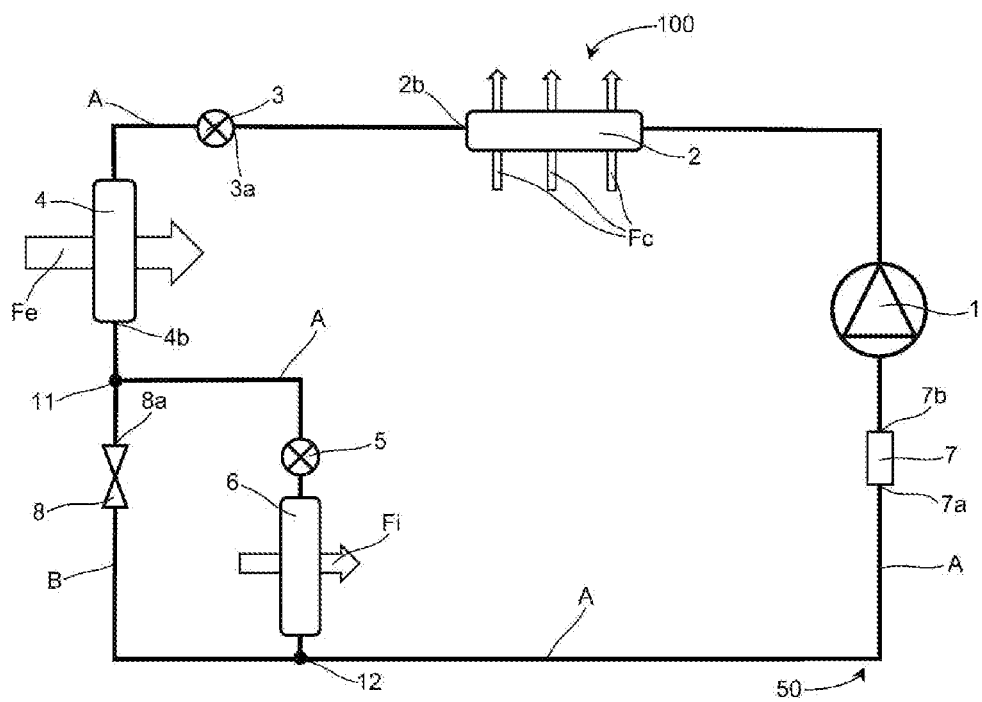
FIG. 1 is a schematic representation of a thermal conditioning system according to a first embodiment of the invention.

In order to make the figures easier to read, the different elements are not necessarily shown to scale. In these figures, identical elements have the same reference signs. Some elements or parameters can be indexed, in other words designated for example first element or second element, or first parameter and second parameter, etc. The purpose of this indexing is to differentiate between elements or parameters that are similar but not identical. This indexing does not imply any priority of one element, or parameter, over another and the designations can be interchanged.

In the following description, the term "a first element upstream from a second element" means that the first element is placed before the second element in relation to the direction of circulation, or travel, of a fluid. Similarly, the term "a first element downstream from a second element" means that the first element is placed after the second element in relation to the direction of circulation, or travel, of the fluid concerned. In the case of the refrigerant circuit, the term "a first element is upstream from a second element" means that the refrigerant travels in succession through the first element, then the second element, without passing via the compression device. In other words, the refrigerant exits from the compression device, optionally passes through a plurality of elements, then passes through the first element, then the second element, then returns to the compression device, optionally after having passed through other elements.

When it is specified that a sub-system comprises a given element, this does not rule out the presence of other elements in this sub-system.

What is meant by "flow of interior air Fi" is an air flow intended for the passenger space of the motor vehicle. This flow of interior air can circulate in a heating, ventilation and air conditioning installation, often referred to as "HVAC". This installation is not shown in the figures.

What is meant by "flow of exterior air Fe" is an air flow not intended for the passenger space. In other words, this air flow remains outside the vehicle. A motor-fan unit, not shown, can be activated in order to increase the flow rate of the flow of exterior air Fe if necessary. Similarly, another motor-fan unit, not shown in the figures, is positioned in the heating installation in order to increase the flow rate of the flow of interior air Fi if necessary.

An electronic control unit, not shown in the figures, receives information from various sensors measuring in particular the characteristics of the refrigerant at various points on the circuit. The electronic unit also receives the instructions input by the occupants of the vehicle, such as the desired temperature inside the passenger space. The electronic unit implements control laws making it possible to control the various actuators, in order to control the thermal conditioning system 100.

Each of the first, second and third expansion devices can be an electronic expansion device, a thermostatic expansion device, or a calibrated orifice. In the case of an electronic expansion device, the cross-section of passage allowing the refrigerant to pass through can be adjusted continuously between a position of closure and a position of maximum opening. For this purpose, the control unit of the system controls an electric motor that moves the movable shutter that controls the cross-section of passage of the expansion device.

The compression device 1 can be an electric compressor that is a compressor with moving parts driven by an electric motor. The compression device comprises a side for aspiration of the refrigerant at a low pressure, also known as the inlet of the compression device, and a side for delivery of the refrigerant at a high pressure, also known as the outlet of the compression device 1 The internal moving parts of the compressor take the refrigerant from low pressure on the inlet side to high pressure on the outlet side. After expansion in one or more expansion units of the circuit 1, the refrigerant returns to the inlet of the compressor 1 and begins a new thermodynamic cycle.

Each connection point allows the refrigerant to pass through one or another of the circuit portions joining at this connection point. The refrigerant is distributed between the two circuit portions joining at a connection point by adjusting the opening or closure of the stop valves or expansion devices included on each of the two branches. In other words, each connection point is a means of redirecting the fluid arriving at this connection point.

The stop valves and the non-return valve thus make it possible to direct the refrigerant selectively into the various branches of the refrigerant circuit, in order to provide different operating modes, as will be described below.

Thus, the first stop valve 8 is configured to permit or prevent selectively the passage of the refrigerant into the first bypass branch B. In the same way, the second stop valve 9 is configured to permit or prevent selectively the passage of the refrigerant into the second bypass branch C.

The refrigerant circuit 1 comprises a device for accumulation of refrigerant 7, which device is positioned on the main loop A upstream from the compression device 1. The refrigerant used by the refrigerant circuit 1 is in this case a chemical fluid such as R1234yf. Other refrigerants could be used, such as R134a for example.

FIG. 1 shows a first embodiment of the invention. FIG. 1 thus shows a thermal conditioning system 100 for a motor vehicle, comprising a refrigerant circuit 50 which is configured to circulate a refrigerant, the refrigerant circuit 50 comprising:

a main loop A comprising in succession in the direction of travel of the refrigerant:

a compression device 1;—a first heat exchanger 2 which is configured to exchange heat with a first heat-exchange fluid Fc;—a first expansion device 3;—a second heat exchanger 4 which is configured to exchange heat with a flow of exterior air Fe, to a passenger space of the vehicle;—a second expansion device 5;—a third heat exchanger 6 which is configured to exchange heat with a flow of air Fi inside the passenger space of the vehicle;—a device 7 for accumulation of refrigerant;—a first bypass branch B connecting a first connection point 11 which is positioned on the main loop A and is between the second heat exchanger 4 and the second expansion device 5, to a second connection point 12 positioned on the main loop A and between the third heat exchanger 6 and the accumulation device 7, the first bypass branch B comprising a first stop valve 8, wherein an inner volume of a portion of main loop A extending from an outlet 2b of the first heat exchanger 2 to an inlet 3a of the first expansion device 3 defines a first reference volume V1, and wherein an inner volume of the accumulation device 7 defines a second reference volume V2, and wherein the ratio R1 of the first reference volume V1 and the second reference volume V2 is greater than 0.2, and preferably greater than 0.4.

The second reference volume V2 is smaller than 0.65 L.

In order to calculate the ratio R1, the value of the first reference volume V1 is divided by the value of the second reference volume V2, each volume V1 and V2 being expressed in the same measurement unit, for example in liters. The ratio R1 is thus a value without dimensions. By way of example, if the first reference volume V1 is 0.3 L and if the second reference volume V2 is 0.5 L, the value of the ratio R1 is then 0.6.

The first reference volume V1 is determined by calculating the inner volume of the portion of refrigerant circuit starting at the outlet 2b of the first heat exchanger 2, and ending at the inlet 3a of the first expansion device 3. It is thus the volume provided for the refrigerant between the outlet 2b and the inlet 3a.

The second reference volume V2, equal to the inner volume of the accumulation device 7, is the volume between the inlet 7a and the outlet 7b of the accumulation device 7. The mass of refrigerant stored in the accumulation device 7 is thus equal to the reference volume V2 multiplied by the mean density of the refrigerant contained in the accumulation device.

The thermal conditioning system 100 is configured to operate according to numerous distinct operating modes. In particular, the thermal conditioning system 100 can implement a process for operation in a heating mode, in which:

the refrigerant circulates in the compression device 1, where it goes to high pressure, and circulates in succession in the first heat exchanger 2, where it yields heat to the heat-exchange fluid and goes into the liquid state, into the first expansion device 3, where it goes to low pressure, into the second heat exchanger 4, where it absorbs heat from the flow of exterior air Fe, and goes into the gaseous state, into the first bypass branch B, and into the accumulation device 7;—then the low-pressure refrigerant returns to the compression device 1.

The fact that the refrigerant goes to high pressure by circulating in the compression device means that the refrigerant exits from the compression device in a so-called high-pressure state. The pressure at the outlet of the compression device is greater than the pressure at the inlet of the compression device. "Passage to the liquid state" means that at least part of the refrigerant condenses and goes into the liquid state. The transformation is not necessarily total, and the refrigerant can be in the form of a mixture of liquid and vapor. In the same way, "passage to the gaseous state" means that at least part of the refrigerant vaporizes and goes into the gaseous state. In this case also, the transformation is not necessarily total, and the refrigerant can be in the form of a mixture of liquid and vapor.

In other words, in the operating mode in heating mode, the portion of main loop A that extends from the outlet 2b of the first heat exchanger 2 to the inlet 3a of the first expansion device contains refrigerant in the liquid state.

On the other hand, this portion of circuit contains refrigerant in the gaseous state when the thermal conditioning system is operating in the mode for cooling of the passenger space.

In fact, when the thermal conditioning system 100 implements a process for operation in a so-called cooling mode:

the refrigerant circulates in the compression device 1, where it goes to high pressure, and circulates in succession in the first heat exchanger 2 without changing state, into the first expansion device 3, into the second heat exchanger 4 where it yields heat to the flow of exterior air Fe, and goes into the liquid state;—into the second expansion device 5, where it goes to low pressure, into the third heat exchanger 6 where it goes into the gaseous state and absorbs heat from the flow of interior air Fi, and into the accumulation device 7;—then the low-pressure refrigerant returns to the compression device 1.

Figure 6:
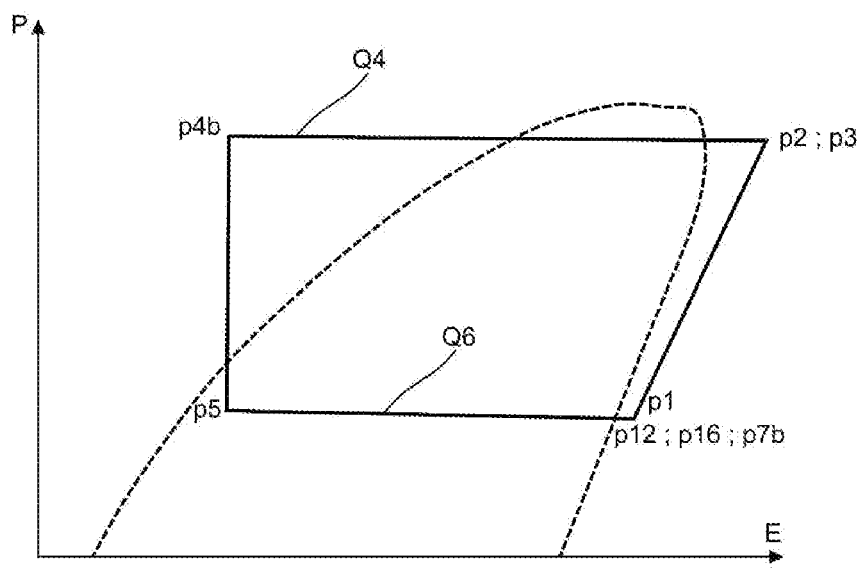
FIG. 6 represents a pressure and enthalpy diagram of the thermal conditioning system of FIG. 1 operating according to a so-called cooling operating mode.

FIG. 6 is a pressure and enthalpy diagram of the refrigerant during the thermodynamic cycle described when the thermal conditioning system 100 is operating in cooling mode. The curve in a broken line corresponds to the characteristic curve of the changes of state of the refrigerant. The trapezium in solid lines corresponds to the thermodynamic cycle created by the refrigerant.

The point designated by p1 schematizes the state of the refrigerant at the inlet of the compression device 1. The points p2 and p3 schematize respectively the state of the refrigerant at the outlet of the first exchanger 2 and of the first expansion device 3. The point 4b schematizes the state of the refrigerant at the outlet of the second exchanger 4, and the sign Q4 schematizes the exchange of heat created between the high-pressure refrigerant and the flow of exterior air Fe within the second heat exchanger 4. The point p5 represents the state of the fluid at the outlet of the second expansion device 5. The points p6, p12, p7b represent respectively the state of the refrigerant at the outlet of the third heat exchanger 6, at the second connection point 12, and at the outlet 7b of the accumulator 7. These points are combined in this diagram, since the losses of load and the thermal losses, for example between the second connection point 12 and the accumulator 7, are considered to be negligible. The sign Q6 illustrates the exchange of heat created between the low-pressure refrigerant and the flow of interior air Fi within the third heat exchanger 6. This exchange of heat ensures the cooling of the flow of interior air Fi.

Figure 7:
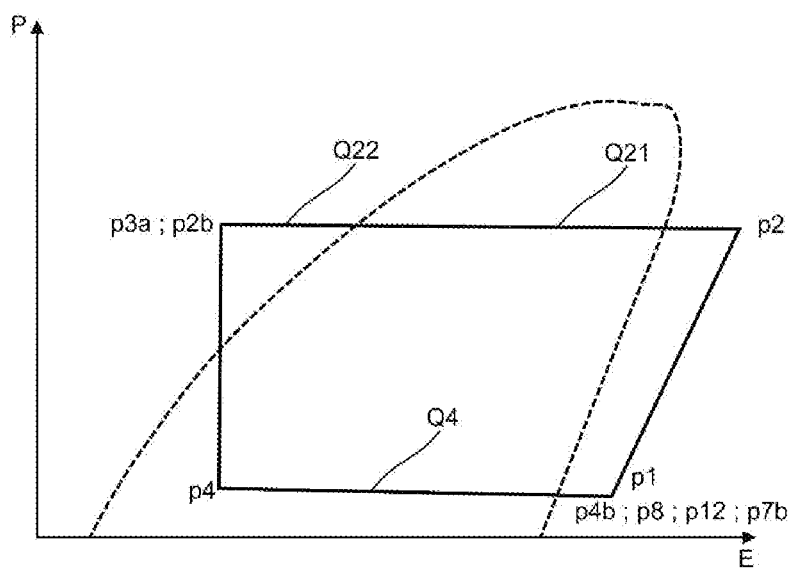
FIG. 7 represents a pressure and enthalpy diagram of the thermal conditioning system of FIG. 1 operating according to a so-called heating operating mode.

FIG. 7 is a pressure and enthalpy diagram of the refrigerant during the thermodynamic cycle described when the thermal conditioning system 100 is operating in heating mode.

The point designated by p1 schematizes the state of the refrigerant at the inlet of the compression device 1. The point p2 schematizes the state of the refrigerant at the inlet of the first exchanger 2. The points p2b and p3a schematize respectively the state of the refrigerant at the outlet of the first exchanger 2 and at the inlet of the first expansion device 3, i.e. before expansion. The signs Q21 and Q22 schematize the exchange of heat created between the high-pressure refrigerant and the flow of interior air Fi within the first heat exchanger 2. This exchange of heat ensures the heating of the flow of interior air Fi. The sign Q21 corresponds to the exchange of heat during the phase of condensation of the refrigerant, and the sign Q22 corresponds to the exchange of heat during the phase of sub-cooling of the refrigerant. The point p4 represents the state of the fluid at the inlet of the second heat exchanger 4. The points p4b, p8, p12, p7 represent respectively the state of the refrigerant at the outlet of the second heat exchanger 4, at the first stop valve 8, at the second connection point 12, and at the outlet 7b of the accumulator 7. These points are combined in the diagram, since the losses of load and the thermal losses for example between the first stop valve 8 and the accumulator 7 are considered to be negligible. The sign Q4 illustrates the exchange of heat created between the low-pressure refrigerant and the flow of exterior air Fe within the second heat exchanger 4.

In the operating mode in cooling mode, the condensation of the refrigerant takes place in the second heat exchanger 4. The portion of main loop A situated upstream from this exchanger 4 thus contains gaseous refrigerant, and therefore has a density lower than the liquid refrigerant. The mass of refrigerant circulating in the circuit 50 is generally greater in cooling mode than in heating mode, since the minimal pressure and the maximal pressure of the thermodynamic cycle are higher in cooling mode than in heating mode. The refrigerant thus has a higher mean density, and therefore the mass of refrigerant circulating in the circuit 50 is greater in cooling mode. The accumulator 7 must therefore store more refrigerant when the system is operating in the mode for heating of the passenger space than when the system is operating in the mode for cooling of the passenger space.

The portion of main loop A which extends from the outlet 2b of the first heat exchanger 2 to the inlet 3a of the first expansion device 3, which is filled with liquid in the heating mode, makes it possible to store the refrigerant which is not circulating in the circuit, i.e. which is not participating in the thermodynamic cycle. By selecting the dimensions of this portion of main loop adequately, it is thus possible to use an accumulator 7 with a smaller volume than in the solutions according to the prior art, since this portion of main loop can play the same part as the accumulator 7. The dimensions are adequate when the ratio R1 of the first reference volume V1 and of the second reference volume V2 is greater than 0.2, and preferably greater than 0.4.

The second heat exchanger 4 can be positioned at the front face of the vehicle, and receives the flow of air generated by the forward travel of the vehicle. The first exchanger 2 and the third exchanger 6 can be positioned in the heating, ventilation and conditioning installation of the vehicle.

The first connection point 11 is positioned on the main loop A downstream from the second heat exchanger 4 and upstream from the second expansion device 5. The second connection point 12 is positioned on the main loop A downstream from the third heat exchanger 6 and upstream from the accumulation device 7. The first connection point 11 belongs both to the main loop A and to the first bypass branch B. Similarly, the second connection point 12 belongs both to the main loop A and to the first bypass branch B. The first stop valve 8 is positioned on the first bypass branch B downstream from the first connection point 11 and upstream from the second connection point 12.

Figure 2:
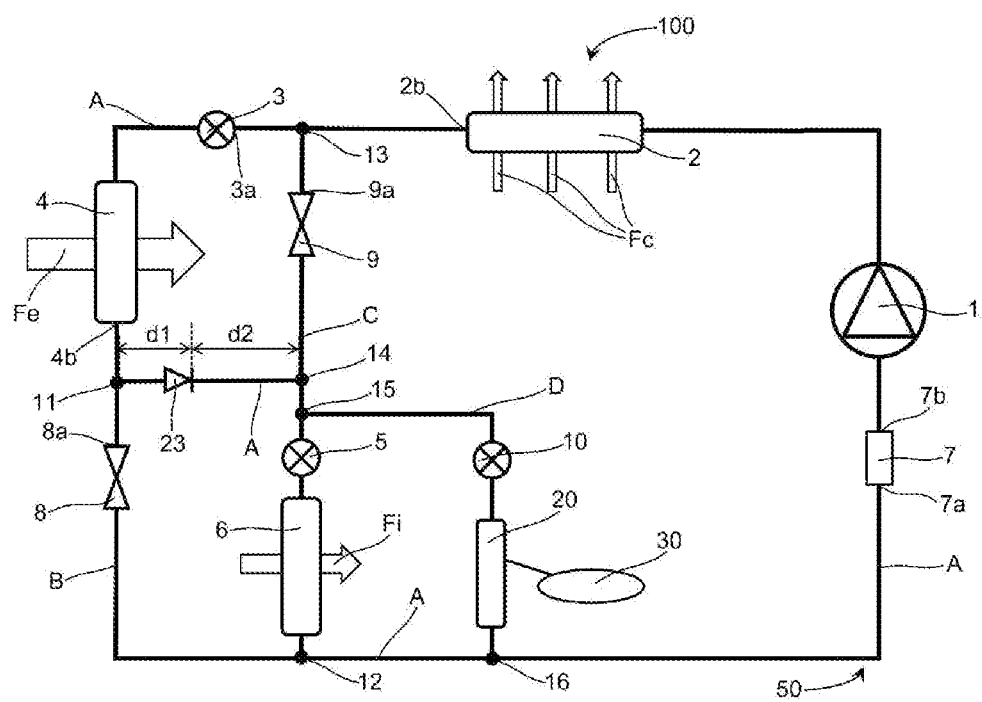
FIG. 2 is a schematic representation of a thermal conditioning system according to a second embodiment of the invention.

FIG. 2 shows a second embodiment of the invention. In this second embodiment, the thermal conditioning system 100 comprises a second bypass branch C connecting a third connection point 13, which is positioned on the main loop A, and is between the first heat exchanger 2 and the first expansion device 3, to a fourth connection point 14, which is positioned on the main loop A, and is between the first connection point 11 and the second expansion device 5, the second bypass branch C comprises a second stop valve 9, the sum of the first reference volume V1 and an inner volume of a portion of second bypass branch C extending from the third connection point 13 to an inlet 9a of the stop valve 9 defines a third reference volume V3, and the ratio of the first reference volume V3 and the second reference volume V2 is greater than 0.3, and preferably greater than 0.5.

The third reference volume V3 is thus the sum of the second reference volume V2, already calculated, and the volume of the portion of circuit starting at the third connection point 13 and ending at the inlet 9a of the stop valve 9.

The second stop valve 9 is configured to permit or prevent selectively the passage of the refrigerant into the second bypass branch C. The main loop A comprises a non-return valve 23 positioned between the first connection point 11 and the fourth connection point 14. The third connection point 13 is positioned on the main loop A downstream from the first heat exchanger 2 and upstream from the first expansion device 3. The fourth connection point 14 is positioned on the main loop A downstream from the first connection point 11 and upstream from the second expansion device 5. The non-return valve 23 is positioned downstream from the first connection point 11 and upstream from the fourth connection point 14.

In this embodiment, the portion of circuit which contains refrigerant which is in the liquid state in heating mode and refrigerant which is in the gaseous state in cooling mode comprises the same portion as in the embodiment of FIG. 1, to which there is added the portion of the second bypass branch C starting at the third connection point 13 and ending at the inlet 9a of the stop valve 9.

As previously, this portion of circuit makes it possible to store refrigerant in the liquid state, which makes it possible to use an accumulator 7 with a small volume, while assuring the same levels of thermodynamic performance.

Figure 3:
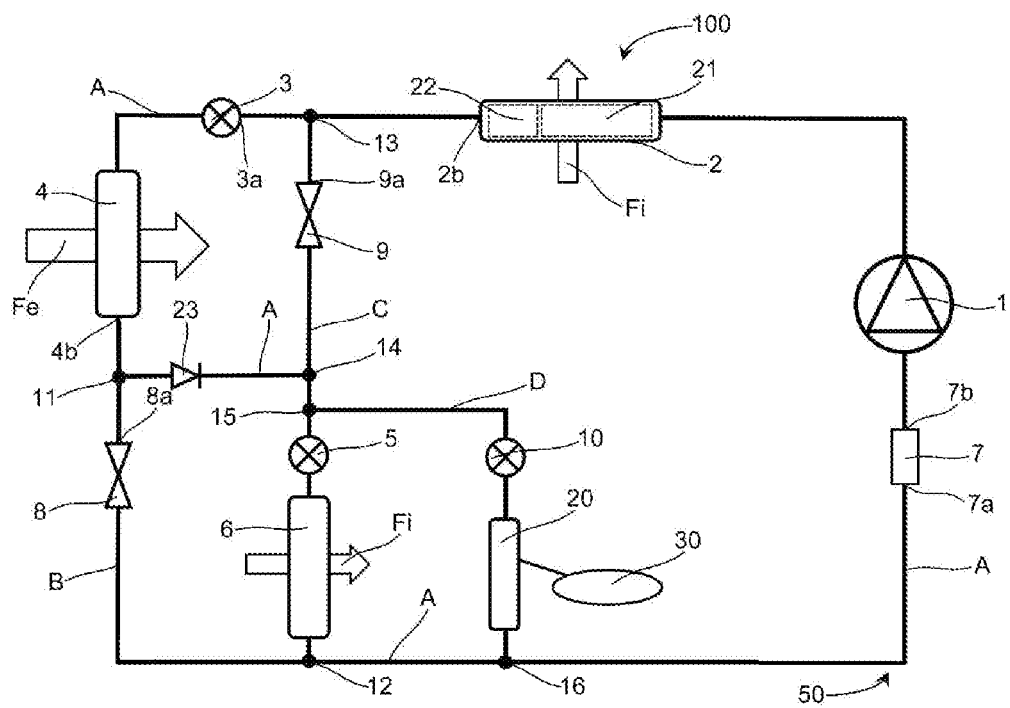
FIG. 3 is a schematic representation of a thermal conditioning system according to a first variant embodiment of FIG. 2.

FIG. 3 is a variant of the embodiment of FIG. 2. In this variant, the first heat exchanger is configured to exchange heat with a flow of air Fi inside the passenger space of the vehicle. The first heat-exchange fluid Fc is in this case the flow of interior air Fi. In order to simplify the figures, the third heat exchanger 6 and the first heat exchanger 2, which are both configured to exchange heat with the same flow of interior air Fi, are not represented side-by-side. In reality, the exchanger 6 and the exchanger 2 are fitted upstream from one another.

In this case, the first heat-exchange fluid Fc is a flow of air Fi inside the passenger space of the vehicle. The first heat exchanger 2 makes it possible to ensure heating of the flow of interior air Fi, and thus to heat the passenger space of the vehicle. The first heat exchanger 2 is in this case known as the internal condenser.

According to an embodiment illustrated in FIG. 3, the first heat exchanger 2 comprises a first heat-exchange section 21, which is configured to ensure condensation of the refrigerant, and a second heat-exchange section 22, which is configured to ensure sub-cooling of the refrigerant, the sum of the third reference volume V3 and an inner volume of the second heat-exchange section 22 of the first heat exchanger 2 defines a fourth reference volume V4, and the ratio of the fourth reference volume V4 and the second reference volume V2 is greater than 0.65, and preferably greater than 0.95.

In other words, the heat-exchange area of the first heat exchanger 2, which ensures the sub-cooling of the refrigerant, also contributes towards creating a refrigerant storage area. This contribution is added to the areas already defined in the preceding paragraphs. The fourth reference volume V4 is thus the sum of the third reference volume V3, already calculated, and of the volume of the part of the heat exchanger 2, which ensures the sub-cooling of the refrigerant.

Figure 4:
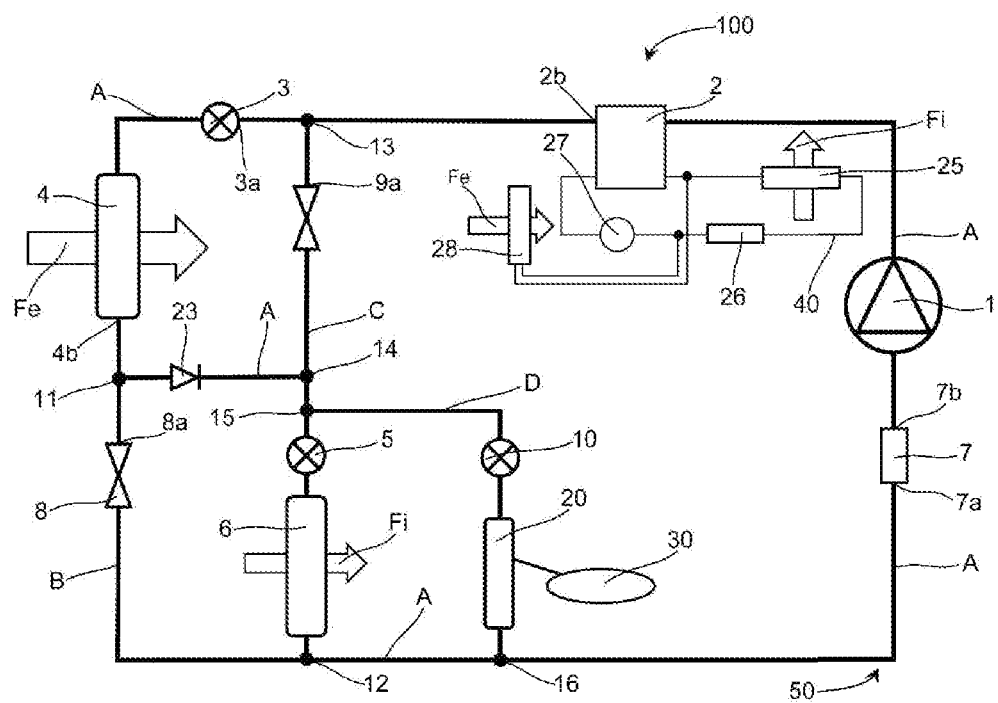
FIG. 4 is a schematic representation of a thermal conditioning system according to a second variant embodiment of FIG. 2.

FIG. 4 is another variant of the embodiment of FIG. 2. According to this variant, the first heat exchanger 2 is configured to exchange heat with a heat-exchange liquid circulating in a heat-exchange liquid circuit 40.

Another words, the first heat-exchange fluid Fc is in this case a heat-exchange liquid. A mixture of water and glycol can be used for example. The first heat exchanger 2 is in this case a bi-fluid exchanger, which is configured to permit the heat exchanges between the refrigerant circulating in the circuit 50, and the heat-exchange fluid circulating in the circuit 40.

The heat-exchange liquid circuit 40 comprises a fifth heat exchanger 25, which is configured to exchange heat with a flow of air Fi inside the passenger space of the vehicle. The passenger space is heated by the fifth heat exchanger 25. For this purpose, the heat-exchange liquid circuit 40 recuperates the heat coming from the condensation in the bi-fluid exchanger 2 of the high-pressure and high-temperature refrigerant coming from the compression device 1.

The heat-exchange liquid circuit 40 comprises a pump 27, which is configured to circulate the heat-exchange liquid in the circuit 40. The heat-exchange liquid circuit 40 also comprises a heating device 26, which is configured to heat the heat-exchange liquid. The heating device 26 is an electric heater. The heating 26 thus makes it possible to complete the action of the bi-fluid exchanger 2 in order to heat the heat-exchange liquid. The heat-exchange liquid circuit 40 also comprises a sixth heat exchanger 28, which is configured to exchange heat with a flow of exterior air Fe to a passenger space of the vehicle. The sixth heat exchanger 28 thus makes it possible to cool the heat-exchange liquid in the operating modes where cooling of this type is required.

According to the embodiments represented in FIGS. 2, 3 and 4, the thermal conditioning system 100 comprises a third bypass branch D connecting a fifth connection point 15, which is positioned on the main loop, and is between the fourth connection point 14 and the second expansion device 5, to a sixth connection point 16, which is positioned on the main loop A, and is between the second connection point 12 and the accumulation device 7, the third bypass branch D comprising a third expansion device 10, which is positioned upstream from a fourth heat exchanger 20. The fifth connection point 15 is positioned on the main loop A, downstream from the fourth connection point 14, and upstream from the second expansion device 5. The sixth connection point 16 is positioned on the main loop A, downstream from the second connection point 12 and upstream from the accumulation device 7. According to a variant, not represented, the fifth connection point 15 can be combined with the fourth connection point 14. Similarly, the sixth connection point 16 can be combined with the second connection point 12.

According to a variant not represented, the third bypass branch D connects a fifth connection point 15, which is positioned on the main loop, and is between the fourth connection point 14 and the second expansion device 5, to a sixth connection point 16, which is positioned on the first bypass branch B, and is between the first stop valve 8 and the second connection point 12, the third bypass branch D comprising a third expansion device 10, which is positioned upstream from a fourth heat exchanger 20. This variant is equivalent to the variant of FIGS. 2, 3 and 4 from a thermodynamic point of view.

The fourth heat exchanger 20 is configured to be coupled thermally to an element 30 of an electrical traction chain of the vehicle. In other words, the third heat exchanger 20 is configured to exchange heat with the element 30 of the traction chain of the vehicle. The exchange of heat can be direct, i.e. the exchanger 20 is in contact with the element 30. The exchange of heat can be indirect, i.e. the exchange of heat between the element 30 and the fourth heat exchanger 20 takes place by means of a heat-exchange liquid circulating in a closed circuit. The element 30 of the electrical traction chain can be an electrical energy storage battery 30. The battery 30 can supply electrical energy to an electric traction motor of the vehicle. The element 30 of the electrical traction chain can be an electronic module for controlling an electric traction motor of the vehicle.

According to aspect of the thermal conditioning system, a sum of an inner volume of a portion of main loop extending from an outlet 4b of the second heat exchanger 4 to the first connection point 11, and of an inner volume of a portion of first bypass branch B extending from the first connection point 11 to an inlet 8a of the first stop valve 8, defines a fifth reference volume V5, and the fifth reference volume is smaller than 0.03 L.

The ratio of the fifth reference volume V5 and the second reference volume V2 is smaller than 0.5, and preferably smaller than 0.1.

In other words, it is desirable for the fifth reference volume to have a low value.

As schematized in particular in FIG. 2, the main loop A comprises a non-return valve 23, which is positioned between the first connection point 11 and the fourth connection point 14, a length of a portion of main loop A extending from the first connection point 11 to the non-return valve 23 defines a first reference distance d1, and a length of a portion of main loop A extending from the non-return valve 23 to the fourth connection point 14 defines a second reference distance d2, and the ratio of the first reference distance d1 and the second reference distance d2 is smaller than 0.5.

Preferably, a volume of a portion of main loop A extending from the first connection point 11 to the non-return valve 23 is smaller than 0.03 L. In other words, the volume of the portion of main loop A corresponding to the first reference distance d1 is smaller than 0.03 L.

Figure 5:
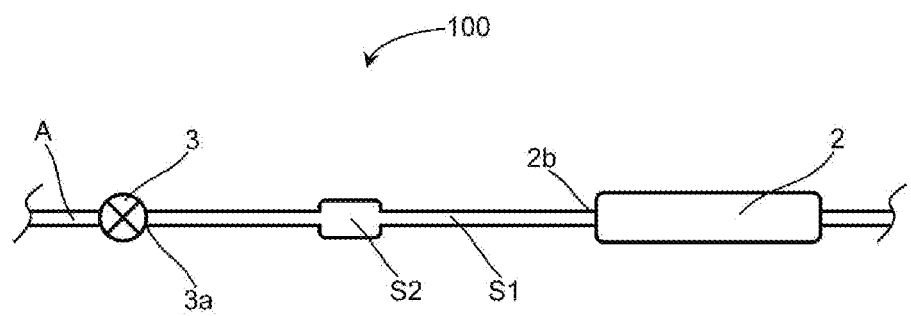
FIG. 5 is a partial schematic representation of a variant of a thermal conditioning system according to the invention.

According to a variant embodiment of the thermal conditioning system 100, part of which is schematized in FIG. 5, the portion of main loop extending from an outlet 2b of the first heat exchanger 2 to an inlet 3a of the first expansion device 3 comprises a first part with a first cross-section of passage S1 for refrigerant, and a second part with a second cross-section of passage S2 for refrigerant, the ratio between the second cross-section of passage S2 and the first cross-section of passage S1 being greater than 2. "Cross-section of passage" at a given location of the refrigerant circuit means the surface area of a straight cross-section of the circuit at this location.

In other words, the portion of main loop extending from an outlet 2b of the first heat exchanger 2 to an inlet 3a of the first expansion device 3 does not have a constant cross-section of passage. An additional volume is added to the tubes of circulation of refrigerant. This additional volume makes it possible to constitute an area for storage of the refrigerant. This additional volume also makes it possible to reduce the noise caused by the circulation of the refrigerant, in particular during sudden variations of pressure.

According to one embodiment of the thermal conditioning system, schematized in FIG. 5, an inner diameter of a portion of main loop between an outlet 2b of the first heat exchanger 2 and an inlet 3a of the first expansion device 3 is greater than 13 mm, and preferably greater than 15 mm. In other words, the tubes used to create this portion of main loop have a diameter larger than that of the solutions according to the prior art, in order to constitute an area for storage of the liquid refrigerant.

The thermal conditioning system 100 can operate according to various operating modes, depending on the flow and pressure of the refrigerant circulating in the main loop A, as well as in the different bypass branches B, C, D.

According to one embodiment, the thermal conditioning system 100 can also implement an operating process in a so-called cooling mode, in which:

the refrigerant circulates in the compression device 1 where it goes to high temperature, and circulates in succession in the first heat exchanger 2 without yielding heat to the flow of interior air Fi, into the first expansion device 3, into the second heat exchanger 4, where it yields heat to the flow of exterior air Fe and goes into the liquid state;—into the second expansion device 5 where it goes to low pressure, into the third heat exchanger 6 where it goes into the gaseous state and absorbs heat from the flow of interior air Fi, and into the accumulation device 7;—then the low-pressure refrigerant returns to the compression device 1. This operating process applies for example to the embodiment of FIG. 3.

According to another embodiment, the thermal conditioning system 100 can also implement a process for operating in another, so-called cooling mode, in which:

the refrigerant circulates in the compression device 1 where it goes to high pressure, and circulates in succession in the first heat exchanger 2, where it yields heat to the heat-exchange fluid, and goes into the liquid state, into the first expansion device 3, and into the second heat exchanger 4;—into the second expansion device 5 where it goes to low pressure, into the third heat exchanger 6 where it goes into the gaseous state and absorbs heat from the flow of interior air Fi, and into the accumulation device 7;—then the low-pressure refrigerant returns to the compression device 1. This operating process applies for example to the embodiment of FIG. 4.

The thermal conditioning system 100 can also implement an operating process in a so-called parallel dehumidification mode, in which:

the refrigerant circulates in the compression device 1, where it goes to high temperature, and circulates in succession in the first heat exchanger 2, where it yields heat to the heat-exchange fluid and goes into the liquid state;—the refrigerant is divided between a first flow circulating in the main loop A and a second flow circulating in the second bypass branch C;—the first flow circulates in the first expansion device 3, where it goes to low pressure, into the second heat exchanger 4 where it absorbs heat from the flow of exterior air Fe, and goes into the gaseous state, circulates in succession in the first bypass branch B;—the second flow joins the main loop A upstream from the second expansion device 5, where it goes to low pressure, and circulates in the third heat exchanger 6, where it absorbs heat from the flow of interior air Fi, and goes into the gaseous state;—the first flow and the second flow join at the second connection point 12, then circulate in the accumulation device 7;—then the low-pressure refrigerant returns to the compression device 1.

In this parallel dehumidification mode, the low-pressure refrigerant circulates in the first heat exchanger 2, in the second heat exchanger 4 and in the third heat exchanger 6.

The thermal conditioning system 100 can also operate in modes, which ensure cooling or heating of the element 30 of the electrical traction chain.

What is claimed is:

1. A thermal conditioning system for a motor vehicle, comprising a refrigerant circuit which is configured to circulate a refrigerant in a direction of travel, the refrigerant circuit comprising:
a main loop, including in the direction of travel of the refrigerant:
a compressor;
a first heat exchanger which is configured to exchange heat with a first heat-exchange fluid;
a first expansion device;
a second heat exchanger which is configured to exchange heat with a flow of air (Fe) outside a passenger space of the motor vehicle;
a second expansion device;
a third heat exchanger which is configured to exchange heat with a flow of air inside the passenger space of the motor vehicle;
a refrigerant accumulation device;
a first bypass branch connecting a first connection point, wherein the first connection point is positioned on the main loop and is between the second heat exchanger and the second expansion device, to a second connection point, wherein the second connection point is positioned on the main loop and is between the third heat exchanger and the refrigerant accumulation device, the first bypass branch including a first stop valve,
wherein an inner volume of a portion of the main loop extending from an outlet of the first heat exchanger to an inlet of the first expansion device defines a first reference volume, wherein an inner volume of the refrigerant accumulation device defines a second reference volume, and wherein a ratio of the first reference volume and the second reference volume is greater than 0.2.

2. The thermal conditioning system as claimed in claim 1, wherein the second reference volume is smaller than 0.65 L.

3. The thermal conditioning system as claimed in claim 1, further comprising a second bypass branch connecting a third connection point positioned on the main loop and between the first heat exchanger and the first expansion device, to a fourth connection point positioned on the main loop and between the first connection point and the second expansion device, the second bypass branch including a second stop valve, wherein a sum of the first reference volume and an inner volume of a portion of second bypass branch extending from the third connection point to an inlet of the second stop valve defines a third reference volume, and wherein a ratio of the third reference volume and the second reference volume is greater than 0.3.

4. The thermal conditioning system as claimed in claim 3, wherein the first heat exchanger includes a first heat-exchange section which is configured to ensure condensation of the refrigerant, and a second heat-exchange section which is configured to ensure sub-cooling of the refrigerant, wherein a sum of the third reference volume and an inner volume of the second heat-exchange section of the first heat exchanger defines a fourth reference volume, and wherein a ratio of the fourth reference volume and the second reference volume is greater than 0.65.

5. The thermal conditioning system as claimed in claim 1, wherein the first heat exchanger is configured to exchange heat with the flow of air inside the passenger space of the motor vehicle.

6. The thermal conditioning system as claimed in claim 1, wherein the first heat exchanger is configured to exchange heat with a heat-exchange liquid circulating in a heat-exchange liquid circuit, and wherein the heat-exchange liquid circuit includes a fifth heat exchanger, which is configured to exchange heat with the flow of air inside the passenger space of the motor vehicle.

7. The thermal conditioning system as claimed in claim 3, including a third bypass branch connecting a fifth connection point positioned on the main loop, and between the fourth connection point and the second expansion device, to a sixth connection point positioned on the main loop and between the second connection point and the refrigerant accumulation device, the third bypass branch including a third expansion device positioned upstream from a fourth heat exchanger.

8. The thermal conditioning system as claimed in claim 1, wherein a sum of an inner volume of a portion of the main loop extending from an outlet of the second heat exchanger to the first connection point, and an inner volume of a portion of first bypass branch extending from the first connection point to an inlet of the first stop valve, defines a fifth reference volume, and wherein the fifth reference volume is smaller than 0.03 L.

9. The thermal conditioning system as claimed in claim 8, wherein a ratio of the fifth reference volume and the second reference volume is smaller than 0.5.

10. The thermal conditioning system as claimed in claim 1, wherein an inner diameter of a portion of the main loop between an outlet of the first heat exchanger and an inlet of the first expansion device is greater than 13 mm.

11. The thermal conditioning system as claimed in claim 3, wherein the main loop includes a non-return valve positioned between the first connection point and the fourth connection point, wherein a length of a portion of the main loop extending from the first connection point to the non-return valve defines a first reference distance, and wherein a length of a portion of the main loop extending from the non-return valve to the fourth connection point defines a second reference distance, and wherein the ratio of the first reference distance and the second reference distance is smaller than 0.5, and wherein a volume of a portion of the main loop extending from the first connection point to the non-return valve is smaller than 0.03 L.

12. The thermal conditioning system as claimed in claim 1, wherein a portion of the main loop extending from an outlet of the first heat exchanger to an inlet of the first expansion device includes a first part with a first cross-section of passage of refrigerant, and a second part with a second cross-section of passage of refrigerant, the ratio between the second cross-section of passage and the first cross-section of passage being greater than 2.

13. The thermal conditioning system as claimed in claim 1, wherein the ratio of the first reference volume and the second reference volume is greater than 0.4.

14. A thermal conditioning system for a motor vehicle, comprising a refrigerant circuit which is configured to circulate a refrigerant in a direction of travel, the refrigerant circuit comprising:
- a main loop including in the direction of travel of the refrigerant:
  - a compressor;
  - a first heat exchanger which is configured to exchange heat with a first heat-exchange fluid;
  - a first expansion device;
  - a second heat exchanger;
  - a second expansion device;
  - a third heat exchanger which is configured to exchange heat with a flow of air inside the passenger space of the motor vehicle;
  - a refrigerant accumulation device;
  - a first bypass branch connecting a first connection point, wherein the first connection point is positioned on the main loop and is between the second heat exchanger and the second expansion device, to a second connection point, wherein which the second connection point is positioned on the main loop and is between the third heat exchanger and the refrigerant accumulation device, the first bypass branch including a first stop valve,
- wherein an inner volume of a portion of main loop extending from an outlet of the first heat exchanger to an inlet of the first expansion device defines a first reference volume, wherein an inner volume of the refrigerant accumulation device defines a second reference volume, and wherein the ratio of the first reference volume and the second reference volume is greater than 0.2.

* * * * *